United States Patent [19]

Marshall et al.

[11] 4,311,044
[45] Jan. 19, 1982

[54] TIRE SIDEWALL BUMP/DEPRESSION DETECTION SYSTEM

[75] Inventors: Christine A. Marshall, Broadview Heights; Michael R. Scalera, Akron, both of Ohio

[73] Assignee: The B. F. Goodrich Company, Akron, Ohio

[21] Appl. No.: 124,007

[22] Filed: Feb. 25, 1980

[51] Int. Cl.³ .................................................. G01M 17/02
[52] U.S. Cl. ................................... 73/146; 324/61 R
[58] Field of Search ........................... 73/146; 324/61 R

[56] References Cited

U.S. PATENT DOCUMENTS

| | | | |
|---|---|---|---|
| 3,771,051 | 11/1973 | Abbe | 324/61 R |
| 4,004,693 | 1/1977 | Tsuji et al. | 73/146 X |
| 4,241,300 | 12/1980 | Hayes et al. | 73/146 X |

Primary Examiner—James J. Gill
Attorney, Agent, or Firm—Alfred D. Lobo; Michael J. Colitz, Jr.; Joe A. Powell

[57] ABSTRACT

A system is disclosed for detecting potential defects as evidenced by surface irregularities in the sidewalls of a tire to be tested. A test is performed on a "uniformity machine" programmed to run standard tire tests. The system preferably utilizes a pair of oppositely disposed non-contact probes, means for distinguishing between 'noise' and a desired signal, means for analyzing and identifying the signal, means for determining whether the identified signal falls within a preselected range, and means for identifying a tire having acceptable or unacceptable bumps and/or depressions. A tire is deemed acceptable when it qualifies within preselected limits for bumps and/or depressions, and unacceptable if it does not so qualify.

8 Claims, 6 Drawing Figures

TIRE SIDEWALL BUMP/DEPRESSION DETECTION SYSTEM

BACKGROUND OF THE INVENTION

Manufactures of tires conventionally test each tire non-destructively to determine whether the tire "qualifies," that is, meets specifications for that tire. More particularly with respect to pneumatic tire casings (hereafter "tires," for brevity) for automobiles, some trucks and the like, each tire which is not deemed visually defective, that is, by inspection with the naked eye, is mounted in a uniformity machine for further tests and inspection. By "uniformity machine" I refer to the type of testing machine such as that manufactured by Akron Standard Mold and designated Model No. 70, conventionally used for non-destructive testing of tires. This machine performs numerous standard tests, some or all of which may be desired on a particular tire. Such tests include uniformity tests, conicity and ply-steer tests, and radial runout tests, inter alia. Detected non-uniformites such as "bumps" in the tread, that is an excess of material, are automatically abraded or ground out. If, after attempting to grind the tire into conformity within preset limits if grinding is required, the tire is still unacceptably non-uniform, the tire is classified according to a predetermined scale of gradation. The uniformity machine provides no directly usable information with respect to bumps/depressions (referring to bumps or depressions, or both) in the sidewalls of a tire.

The problem of potential defects due to bumps/depressions, irrespective of how or why they are formed in the sidewalls of a tire, is generally not of major significance in a multi-ply tire because such defects in its sidewall are relatively minor if not inconsequential, in that they affect neither the performance of the tire, nor its visual acceptability. Stated differently, bump/depression defects in a sidewall of a multi-ply tire are generally regarded as a non-problem because when a multi-ply tire is constructed with plural plies, such defects as may be attributable to one ply tend to be sufficiently negated by another ply. The result is that no detectable defect is present in the finished tire, which defect might affect either the performance of the tire, or vitiate its visual acceptability. There is no such off-setting effect of possible defects (whether detectable or not) when a monoply (single ply) tire is constructed. Though, in the past, monoply tires were very much in an exceptional category, they are presently used extensively on the smaller fuel-efficient cars (having a wheelbase of less than 111 inches) now in demand, as a monoply tire provides desirable performance both with respect to comfort and safety at an economical price.

As conventionally constructed, any monoply tire is prone to exhibit bumps/depressions in its sidewall, the extent to which these are present being simply a matter of degree. If personal perception indicates that there is a gross defect, such as for example is visible to the naked eye, or can be perceived by touch, the tire is rejected without further testing. However, quite routinely, a tire's sidewall appears to the eye, or to the touch, to be substantially free from unacceptable or unsightly bumps/depressions when not inflated, yet, upon inflation, it is found that the sidewall is, in fact, unacceptable. Similarly, personal perceptive faculties may indicate the presence of apparently unacceptable bumps/depressions sufficient to convince the observer that the tire should be rejected, yet further tests show that the tire is, in reality, well within the limits of acceptability. Tires which fall in either of the foregoing categories, and also tires which might be inspected and adjudged by personal perceptions as being acceptable by one set of observers yet judged unacceptable by another set of observers, are referred to as being marginally qualified. In other words, if a tire can be rejected by personal perception even if there is absolutely nothing unacceptable about its sidewall, or if it can be "passed" as a good tire even if it is actually unacceptable, irrespective of how non-destructive, known quality control tests may presently be conducted, the tire is deemed marginally qualified. Whether the tires are marginally qualified is wholly unrelated to their quality, it now being evident that a high quality sidewall may fail a visual or 'touch' inspection, a low quality tire may pass it, and one of marginal quality may either pass or fail it. It is recognized that the presence of easily perceptible bumps/depressions does not, ipse facto, characterize a monoply tire as being defective, but it might, and therefore might suggest a potential defect which could lead to tire failure. It is to tires which are marginally qualified that this invention is particularly directed.

It is unnecessary to state that a blowout due to the failure of a tire can be disastrous, and in recent years much effort has been devoted to the problem of manufacturing a tire which meets the specific performance standards set for safe tires. A tire which is presumed acceptable is routinely subjected to numerous tests on a uniformity machine to ensure that the tires meet the preferred specifications for that line of tires. However, broken cords and ply separation are hidden defects difficult to detect on a uniformity machine, and a recent attempt to provide a more reliable testing apparatus for such hidden defects is disclosed in U.S. Pat. No. 3,815,407 in which the apparatus utilizes a source which causes a resonant frequency of the tire. Variations in resonant frequency as well as variation in transmission characteristics are measured in this "active" system, and the information collected via a pair of oppositely disposed contact probes on the sidewalls. The information collected permits the identification of both the presence and the nature of hidden defects in the tire. It is also stated therein that prior art methods for non-destructive testing of tires using contact probes were sensitive to local variations in tire mass and elasticity, and also to variations in coupling between the source and the pickup transducers and the tire.

Prior art methods of non-destructive testing were also unable to differentiate between defects and normal variances in tire structure. Moreover, since data provided by receiver transducers in the prior art were characterized by a complex waveform, non-destructive testing of tires could not previously be readily automated. Specifically, with regard to the use of contact probes, not only do they provide a signal which makes it difficult to identify the nature of the defect sensed, but the testing has to be done at a relatively low rotational speed pf the tire, less than 10 revolutions per minute (rpm), or the contact probes do not function usably. As is well known, a uniformity machine tests a tire at relatively high rotational speeds in the range from about 30 rpm to about 100 rpm, and more preferably at 60 rpm. It is critical in the particular application of this invention, that the tire be tested at the particular operating speed of the uniformity machine if the testing is to be accomplished at an affordable cost. In view of the fact that only contact probes in an "active" system were deemed to be adequate to provide a desirable signal, it was wholly unexpected that non-contact probes in a "passive" system might be adapted to serve the same function. Moreover, having initially found that signals received from a non-contact probe sensing a sidewall surface appeared to be meaningless, and particularly to have no meaningful relationship to the variations in sidewall surface which it was supposed to sense, irrespective of rotational speed, it was surprising that the apparently meaningless signals could be processed to distinguish between normal, acceptable variations in the sidewall, and unacceptable variations in a defective sidewall.

SUMMARY OF THE INVENTION

It has been discovered that a capacitance transducer (also referred to as "receiver transducer" or simply "probe"), may be mounted in spaced apart relationship with the sidewall of a tire (hence, "non-contact probe"), which tire in turn is mounted in a mechanism for rotationally driving the tire, such as a tire testing "uniformity" machine, so that signals sent by the non-contact probe can be used to distinguish between acceptable tires having bumps/depressions deemed normal variations in the construction of a sidewall of a tire, and unacceptable tires having bumps/depressions which might presage a potential defect.

It is therefore a general object of this invention to provide a system for detecting potential defects on the sidewalls of tires, which system comprises a pair of oppositely disposed non-contact probes, means for mounting the probes in spaced apart sensing relationship with the sidewalls of a tire to be tested, electronic scaling means to amplify the signals from the probes, analog filter means to filter the signals and produce signals of usable slope, microcomputer means to further digitally filter, then analyze the filtered signals, and means to identify the tire tested as being either acceptable or not, without the personal perceptions of an inspector.

It is also a general object of this invention to provide a method for detecting potential defects in the sidewall of a tire, comprising mounting the tire in a uniformity machine, locating a pair of non-contact probes in close proximity to each sidewall of the tire and in sensing relationship thereto, amplifying signals from the probes, filtering the signals to distinguish 'noise' and 'runout' from desired signal, detecting the slope of a trace of the signals within a preselected segment, and identifying the tire as being either rejected or accepted depending upon whether the slope falls within a preselected range.

It is a more specific object of this invention to provide a means for testing a tire for potential side wall defects while the tire is rotating at a preselected speed, for example 60 rpm, in a conventional uniformity machine, using a pair of oppositely disposed non-contact probes which are moved near to the sidewall of a tire to be tested in the uniformity machine, and away from the tire when the tire is to be demounted from the machine.

The above and other objects, features and advantages of the invention will become clear from the following description, taken in conjunction with the accompanying drawings which show by way of example one particularly preferred embodiment of the invention.

DETAILED DESCRIPTION OF A PREFERRED EMBODIMENT

In a preferred embodiment of the invention, a tire is tested for sidewall defects while it is mounted on a uniformity machine on which standard tests are to be conducted. Persons skilled in the art of testing tires are aware that a uniformity machine utilizes a synchronous motor which in this specific illustration rotates a mounted tire at a speed of about 60 rpm. It is both impractical and difficult to slow down the rotation of the tire at the end of its normal testing cycle, or to give the tire an initial slow revolution or two. Assuming a slow-down was feasible and acceptable, the sidewall may be tested with a contact probe, but such a test at slow speed, is economically undesirable. Contact probes are known to produce usable signals when translated over bumps/depressions in a surface to be tested, but available contact probes, in contact with the sidewall surface, do not sense surface defects adequately at speeds in excess of about 10 rpm and, more usually operate at less than about 2 rpm, and most typically at 1 rpm.

Figure 1:
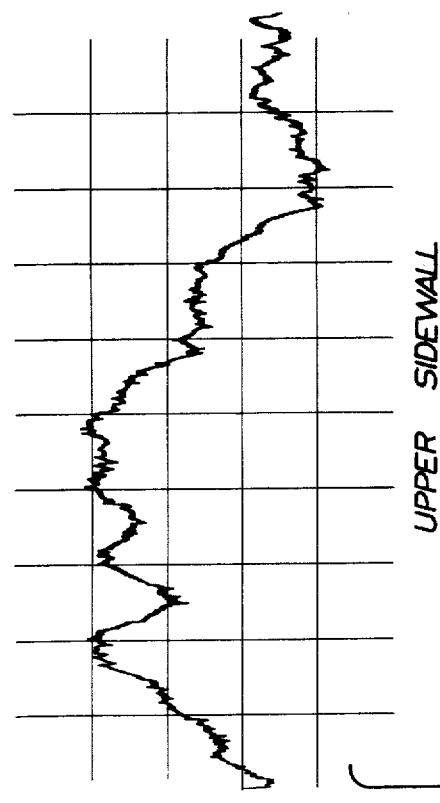
FIG. 1 is an inadequately filtered trace of signals received from non-contact probes in sensing relationship with the sidewall of a particular tire, through one revolution of the tire, where the signal has been amplified and filtered in an initial unsuccessful attempt to use the signals.
Figure 1:
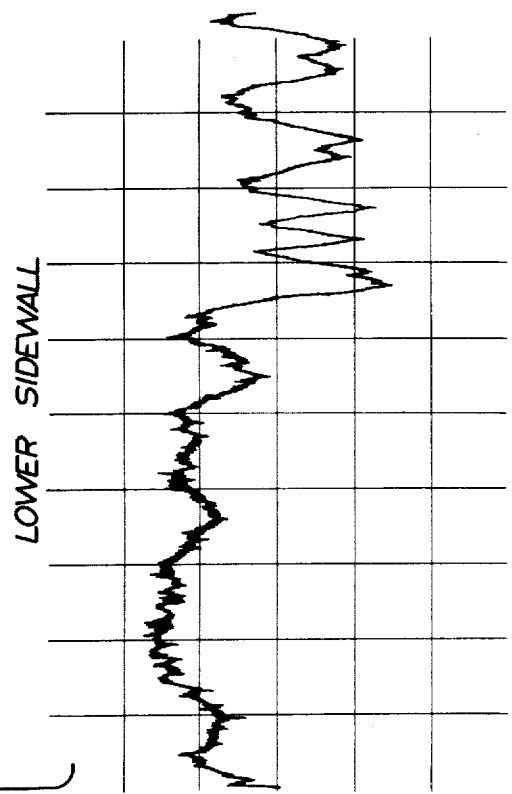

An initial test on a particular tire, by substituting non-contact probes so as to provide a passive system, for contact probes such as have been used in an active system, and utilizing an analog filter means to filter out extraneous mechanical and electrical 'noise', produced signals in a complex wave form typified by one illustrated in a trace reproduced as FIG. 1. The recorder itself limited response above about 30 Hz. As will be readily apparent, even in the limited range below about 30 Hz, there is no indication that there may be any correlation between the signal sensed and the actual condition of the surface of a sidewall of a tire. Nevertheless, an attempt was made to set a "norm" so as to be able to monitor deviations therefrom, but the approach proved unsatisfactory as no norm could be established. Similarly, an attempt to set a base from which to make a regression analysis also proved unsatisfactory because the base could not be set. Thus it was clear that there was no basis which could be established for making a meaningful correlation between the trace produced by the signals from the non-contact probes, and the actual extent of any predefined defect, and therefore no reliable way to either qualify or disqualify a tire which is tangibly or visually deemed anything but grossly defective.

Despite the foregoing indications of unsuitability of non-contact probes, it has been found that weak signals transmitted by them, when adequately amplified and filtered, provide sufficient information to identify the irregularity, to allow rejection or acceptance of a tire based on predetermined criteria of acceptability for that tire, and to actuate suitable tire marking means.

It will be evident to those skilled in the art that the system of this invention will be operable with a single non-contact probe which may be utilized to check one sidewall, and then the other. The method for utilizing a single probe can be easily deduced from the detailed description of the method for utilizing twin, oppositely disposed probes. As will also be evident to those skilled in the art, practical considerations of speed and cost, militate against utilizing a single non-contact probe. Therefore the detailed description hereinbelow will be particularly directed to a system having a pair of non-contact probes from which signals are transmitted essentially simultaneously.

It will also be evident that the non-contact probes will sense the surface irregularities of an uninflated tire which is rotated by any mechanism for drivingly rotating the uninflated tire about its normal axis of rotation, for example, a "whitewall grinding machine". Such a machine is used to permit the overlying black rubber to be ground off, exposing the whitewall underneath. However, irregularities in a sidewall's surface are far less noticeable and less easily sensed by a probe, on an uninflated tire compared with one that is inflated. Hence it is much preferred to mount the tire to be tested in a mechanism which inflates the tire, such as a uniformity machine which is routinely used, and the description hereinbelow will be specifically directed to the use of uniformity machine. All references to uninflated are to mean below normal operating pressure.

Figure 2:
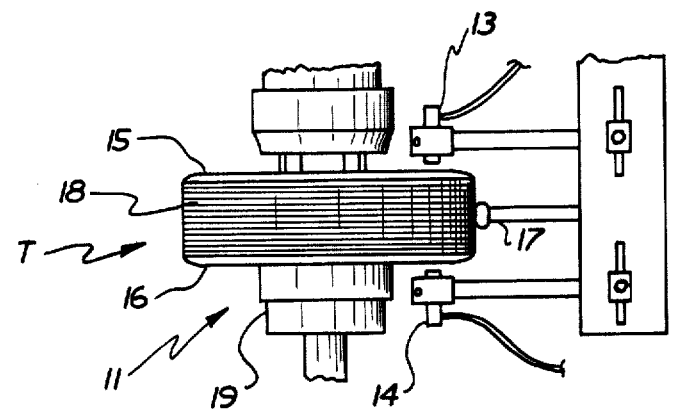
FIG. 2 schematically illustrates a tire to be tested, mounted in a conventional "uniformity machine," and non-contact capacitance probes are oppositely disposed in sensing relationship with each sidewall.

Referring now to FIG. 2, there is schematically illustrated a tire T mounted in a conventional uniformity machine indicated generally by reference numeral 11. The tire T is mounted in the horizontal plane adjacent a frame indicated generally by reference numeral 12, from which upper and lower capacitance probes 13 and 14 may be swingably positioned in spaced apart but sensing relationship with the upper and lower sidewalls 15 and 16 respectively. A conventional contact runout probe 17 is also mounted in the frame 12, and is adapted to contact the surface of the tread 18 of the tire T to provide routine information. The tire T is 'chucked' on a wheel rim means such as a wheel chuck 19 in the uniformity machine, immediately inflated and rotated at 60 rpm about the tire's normal (here, vertical) axis. Just prior to the tire beginning its rotation, upper and lower capacitance probes 13 and 14, and runout probe 17, are positioned to transmit signals from the tire. The probes are connected to means (not shown) for analyzing the signals transmitted, as will be described in further detail hereinbelow.

Figure 3:
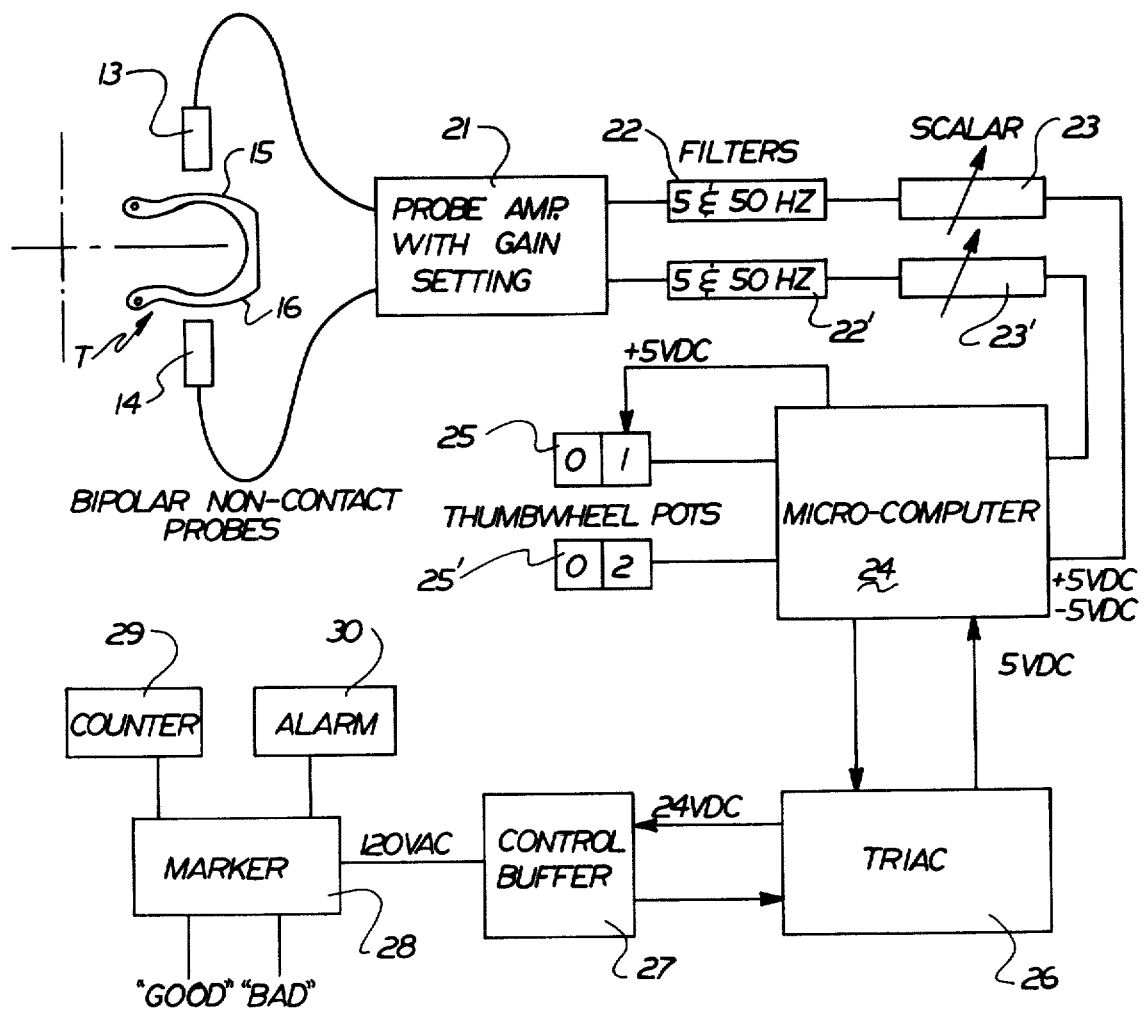
FIG. 3 is an electrical circuit block diagram of the embodiment of FIG. 2.

Referring now to FIG. 3, there is schematically illustrated an electrical circuit block diagram of the apparatus referred to in FIG. 2. As shown in FIG. 3, upper and lower capacitance probes 13 and 14 are positioned about 1 inch from the upper and lower sidewalls 15 and 16 respectively, of tire T, shown in cross-section. The cross-section is that part of the tire that lies in a plane containing the normal axis of rotation of the tire. Signals from the probes 13 and 14 are fed to a probe amplifier with a gain setting, indicated generally by reference numeral 21. Since this invention is concerned with a method and means for detection utilizing the capacitance probes 13 and 14, no further reference will be made to runout probe 17 and allied means for analyzing signals from it, since they are conventional and well known in the art. Signals from the probe amplifier 21 are filtered through filters 22 and 22', scaled by scalers 23 and 23', then received by microcomputer 24 equipped with two pairs of thumbwheel binary coding devices 25 and 25'. Signals from the microcomputer are fed to a Triac (TTL converters) 26, and then to a control (buffer) 27. A marker 28, on signal from control (buffer) marks a tire to classify it as either "good" (that is, qualified tire) or "bad" (that is, disqualified). A counter 29 and an alarm 30 operate in conjunction with the marker, so as to keep count of the number of tires rejected, and to sound an audible or visual alarm (or both) when a "bad" tire is detected.

Figure 4:
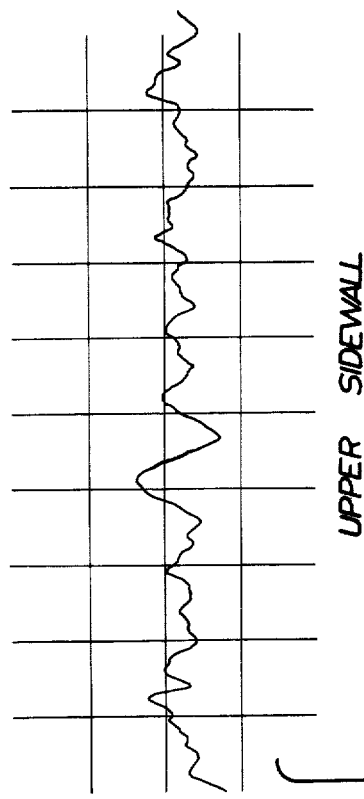
FIG. 4 is a typical, usable trace with which the system works, this particular trace having been obtained by adequately filtering the trace of the same tire shown in FIG. 1.
Figure 4:
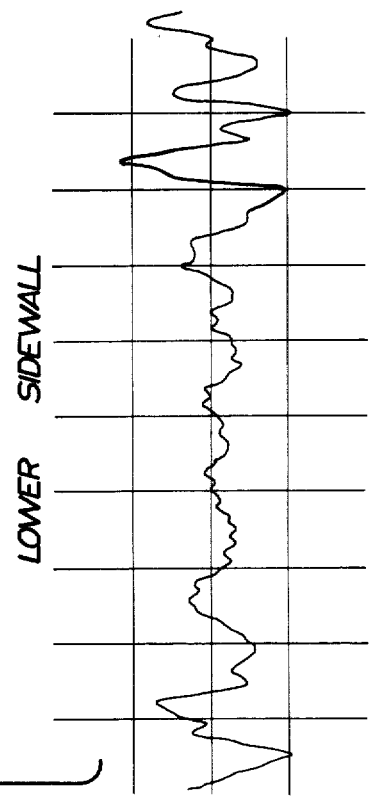

A weak signal is generated simultaneously in the transducers 13 and 14 as each senses surface irregularities as bumps/depressions in each sidewall of the tire. In the control circuit, the signals are suitably amplified, first by a signal conditioner (not shown), and then by an amplifier 21 which desirably produces signals in the range usable by the microcomputer 24. A suitable amplifier includes a power supply and standard circuit boards of The B. F. Goodrich Company identified as follows: Scalar and Zero Suppresss #LPF 15-4; Photo Isolation #PCI-1; Control #GATE-1; and Relay Driver #RD-1. The signals are then filtered to obtain a bandpass in the range from about 2 Hz filter, and then through a 50 Hz filter, thus diminishing electrical and mechanical 'noise' from the uniformity machine, the probes, the amplifier and the analog to digital converter in the microcomputer. More preferably, with non-contact probes Model No. 70 available from Mechanical Technology Corp., the signals are filtered to leave those within the range from about 5 Hz to about 30 Hz. Such filtration also diminishes extraneous signals due to raised lettering on the sidewalls of the tire, vent stubs, and especially runout, inter alia. The signals are then scaled in the range from −5 VDC to +5 VDC by scalars 23 and 23' to provide a wave form such as that reproduced in FIG. 4, for use in the analog portion of the microcomputer. These output signals are fed to the analog-to-digital converter of the microcomputer, further digitally filtered, and used with the assistance of an assembly language subroutine which arranges the data in a convenient format adapted to be analyzed by a defect detection algorithm (described more fully hereafter).

The microcomputer provides two basic functions. The first function is a calibration routine which allows the user to calibrate the capacitance transducers used for measurement. The second function is the tire test routine which analyzes data from the capacitance transducers to determine if there are any defects on the sidewalls of the tire. The microcomputer system is set up to accept inputs from −5 to +5 volts. Operational details of the two basic functions of the microcomputer are set forth hereinbelow.

Transducer Calibration Routine

A toggle switch is provided to allow an operator to signal the microcomputer that he is about to calibrate the transducers whereupon the microcomputer immediately begins the calibration routine.

The first step in the calibration routine is to clear all the outputs from the microcomputer. Next the microcomputer reads the settings on each of four thumbwheels only two of which are meaningful in the calibration mode, one for each transducer. The operator selects a transducer which is not being calibrated, by setting the thumbwheels for that transducer to some value greater than 5.0. On the thumbwheel used for the transducer being calibrated, the operator sets the voltage level which the microcomputer is expected to read during this phase of calibration. Values that may be set during calibration may range from 0 to 5.0 volts. The microcomputer will then compare the input coming from the transducer being calibrated to the value dialed in on the thumbwheel by the operator.

If the values are exactly equal, only one light lights up, indicating that no valid data for tire tests has been read. If the input from the transducer is higher than the value on the thumbwheel, another light will be turned on indicating the transducer signal is high. If the transducer signal is lower than the thumbwheel setting a different light will be turned on to indicate that the transducer signal is low. After turning on the appropriate lights the position of the toggle switch is again read to determine either if the microcomputer is still in the calibration mode, or if the operator has finished the calibration routine. If the toggle switch is no longer in the calibration position all the digital outputs are cleared. This means all the lights are turned off and the system returns to an idle loop waiting for a tire test to begin, or for the switch to be placed in the calibrate position.

The Tire Test Routine

The actual testing of a tire in the system is initiated by a hardware interrupt. When this interrupt occurs the program branches immediately to the tire test routine. The first step in the tire test routine is to clear all the digital outs. Next the input data from the transducers is read by the microcomputer, using an assembly language routine. This routine reads in one thousand points per second from each of the two transducers. A total of 1024 points are read in for each side of the tire being tested. The data is then arranged in a convenient format for the defect detection algorithm to handle.

Next the input on all four thumbwheels provided for the system are read. The thumbwheel settings now indicate the width and amplitude of a defect that will cause a tire to be rejected. One thumbwheel is used to indicate the amplitude of a bump which is unacceptable. A second thumbwheel indicates the width of a bump which is unacceptable. In an analogous manner, the second pair of thumbwheels is used to indicate the amplitude and width of a depression which is unacceptable.

Amplitude is indicated in thousandths of an inch by the thumbwheel settings, while the width is indicated on the thumbwheel is percent. For example, a setting of 10 of the thumbwheel indicating the width of a bump would mean that the algorithm should examine every 1.0 percent of the tire circumference to determine if there is a bump present.

Once a complete data set has been collected, the microcomputer is ready to examine the data using the defect detection algorithm. The algorithm examines the data from each side of the tire individually. The algorithm also examines each side of the tire first for bumps, and then, again searches that same set for depressions before moving on to the second side of the tire.

The first step in searching for a bump is to smooth the data by calculating a running average for the data set. The number of data points included in the running average calculation is determined by the width of the defect that is set by the operator on the thumbwheels. For example, if the operator specifies a width of 1.0 percent of the tire's circumference, only 1 percent of the data samples will be used in calculating each running average. If 1000 data points around the tire are collected, 10 data points will be used to calculate the running average in this example. The first running average would be the average of the first 10 data points collected; the second running average would be the average of data points, numbers 2 through 11, and so on.

Next the algorithm searches this averaged data looking for a slope which indicates a possible bump on the tire sidewall. Based on the data collected during testing, the algorithm expects that a bump will be indicated by a negative slope. If a negative slope is encountered, the peak to peak variation in that segment of data sampling is calculated. Each time a negative slope is encountered the absolute value of the peak to peak variation is compared to the current maximum peak to peak variation stored. Only one value of a variation is stored for a possible bump on this side of the tire. After searching the data for any possible bumps the algorithm then proceeds to searth for depressions by recalculating the running averages based on limits set in for a depression. The same peak to peak method is used to locate positive slopes which would indicate a depression in the sidewall. A maximum value of peak to peak variation for positive slope is also stored for this side of the tire.

The peak to peak variation is first used to test validity of the data which were collected. Both the maximum variation for a bump and for a depression must exceed a certain minimum value. If the minimum variation is not exceeded, the microcomputer system stops any further testing of that data set. A special signal maybe used at this time to alert the operator that no valid data was read during the test. Such a signal, perhapss a special light, would alert the operator to possible difficulties with the probes.

These maximum variations for bumps/depressions are then compared to the amplitudes of the bump/depression set by the thumbwheels. If the maximum peak to peak variations for either the bump or the depression exceeds the limit set on the thumbwheels, the tire is rejected by setting a digital output. This indicates to the tire marking means that the tire should be encoded with a color of paint indicative of a 'reject'. If no defects are found on the first side of the tire, the 1024 points for the second side of the tire are examined in a similar manner, first looking for bumps, and then for depressions. If no defects are found on the second side of the tire, it is accepted, this being acknowledged by setting a digital output which actuates the marking means which in turn identifies the tire with an appropriate color code.

Inputs on a thumbwheel may require some scaling before they are used by the microcomputer. The inputs from thumbwheels which indicate the width of defects will not need scaling since they are being fed as percent of the tire circumference. However, the amplitude factor is scaled, considering the volts per inch of change being sent to the microcomputer by the transducer. This factor is then used to scale the numbers dialed in on the thumbwheels from thousandths of an inch, to the unit system being used by the defect detection algorithm.

The foregoing method for using the system may be described in more precise equational form in which the definitions of variables is as follows:

NB = No. of samples to average when looking for bump = Thumbwheel (3) ND = No. of samples to average when looking for depression = Thumbwheel (4)

NNN = Total No. of samples on one side of the tire, which number NNN is greater than NB + ND.

LB = limit for "acceptable" bump = Thumbwheel (1)
LD = limit for "acceptable" depression = Thumbwheel (2)

Step 1: Collect NNN data points per side of tire, where V = value of one data point Step 2: Calculate running average, $RunAvg_j$, for $j = 1$ to $j = NNN - NB + 1$ t,140

Step 3: Examine running averages in groups of NB: Group j contains $RunAvg_j$ thru $RunAvg_{NB+j-1}$ From each group select the maximum and minimum for $j = 1$ to $NNN - NB + 1$ Step 4: $Delta_j = RunAvg_x - RunAvg_y$ Step 5: Segment contains potential defect if $(x - y)$ is negative, indicating a bump. (The circuit may be arranged so that a positive slope indicates a bump). From a subset of segmens containing defect find $Delta_{max}$. If $Delta_{max}$ is less than LB, no bump was found.

Step 6: Repeat the foregoing procedure for the tire, on the same sidewall, using ND and LD instead of NB and LB.

Upon completion of the foregoing for one sidewall of a tire, repeat the entire procedure for the other sidewall of the tire.

Figure 5:
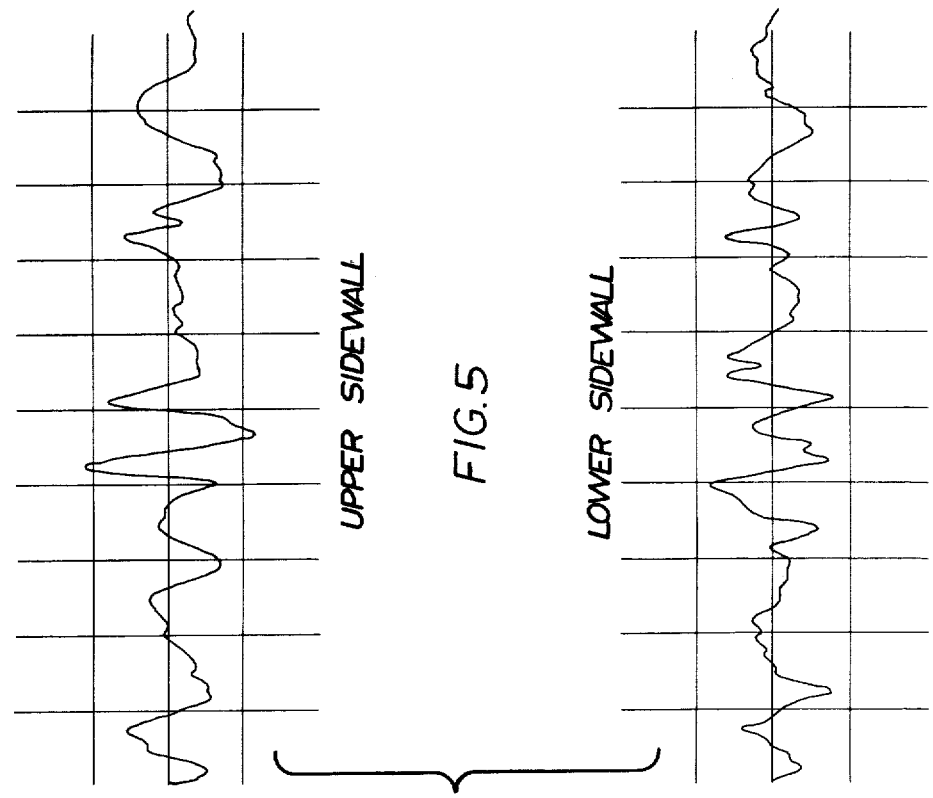
FIG. 5 is a typical, usable trace for the upper and lower sidewalls of an acceptable tire which meets preselected specifications, and is therefore deemed 'qualified' in that line of tires.

Referring now to FIG. 5 there is shown a suitably filtered trace, over a single revolution, of the surface of each sidewall of a particular monoply tire, as the probes "see," that is, sense the irregularities in the surface. Irrespective of where a median line may be drawn through each trace, it is difficult to assess the overall implication of acceptability of the tire within predetermined limits. It might be assumed from the relatively large displacement of peaks near the upper trace in particular, that this tire will not qualify as being acceptable. Yet, the system indicates that it is, and a careful visual and 'touch' inspection of the inflated tire by an experienced operator, confirms the tire's acceptability.

Figure 6:
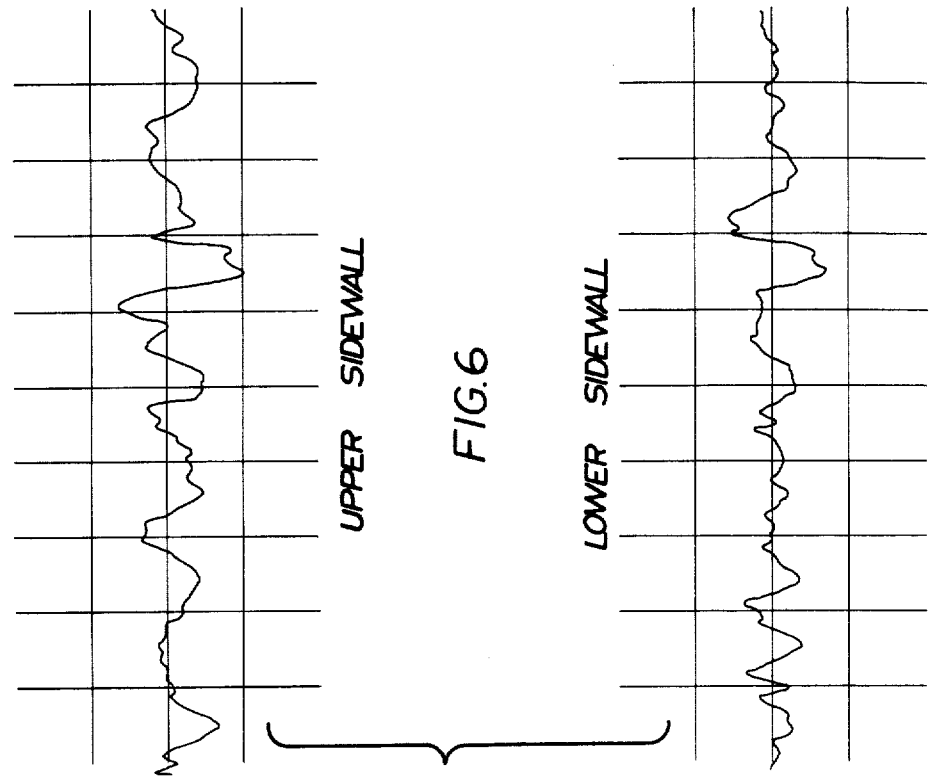
FIG. 6 is a typical usable trace for the upper and lower sidewalls of an unacceptable tire which fails to meet the same preselected specifications set for the acceptable tire a trace of which is illustrated in FIG. 5; the unacceptable tire is therefore deemed 'disqualified' in that line of tires.

Referring now to FIG. 6 there is shown a suitably filtered trace over a single revolution, of the surface of each sidewall of another monoply tire. Again, irrespective of where a median line may be drawn through the upper and lower traces for the sidewalls, it is evident that there appear to be some rather large displacement of peaks, through, comparing these traces with the traces of FIG. 5, the apparent overall displacement of peaks appears to be less than in FIG. 5. Thus, assuming one of the tires for which traces are shown in FIGS. 5 and 6 is 'qualified,' it would appear that the particular one generating the traces of FIG. 6 would be the one qualified. Yet, the system indicates that it is not qualified, and a careful visual and 'touch' inspection of the inflated tire by an experienced operator fails to disqualify the tire, and improvidently passes the tire.

It will be appreciated from the foregoing description that the system of the present invention can inspect for bumps/depressions in the sidewalls of a pneumatic tire without relying upon the experience and personal perceptions of an operator, and in its most preferred embodiment, does so on an existing tire testing machine, within prescribed time limits, at minimal cost.

I claim:

1. An apparatus for automatically inspecting a pneumatic tire for broken cords and ply separation evidenced by superficial bumps/depressions in sidewalls of said tire, comprising in combination:
   a tire testing machine for rotatably retaining said tire in an inspecting position; rotational driving means for rotatingly driving said tire at a preselected speed; at least one non-contact capacitance probe for sensing bumps/depressions in said sidewalls's surface and transmitting signals corresponding to said bumps/depressions sensed, said probe being disposed in spaced apart sensing relationship with said sidewall; electric control circuit means connected to said probe for producing a disqualifying signal including
   (a) amplifier means for amplifying signals from said probe within a preselected range,
   (b) filter means effective to produce a band pass of about 2 Hz to about 50 Hz, so as to diminish extraneous 'noise,'
   (c) scalar means adapted to provide a usable wave form,
   (d) analog to digital converter means responsive to said signals in digital form,
   (e) computer means responsive to said signals in digital form, including
      (i) means for taking a running average including means for indicating the width and amplitude of a bump/depression which is unacceptable, and means for adjusting the amplitude and frequency of the bump/depression limits to detect bumps/depressions sufficient to cause said tire to be deemed unacceptable;
      (ii) means to produce a disqualifying signal, and, classifying means for distinguishing a disqualified tire from qualified tires.

2. The apparatus of claim 1 including in addition, buffer means to delay the output of said disqualifying signal to said classifying means.

3. The apparatus of claim 2 wherein said classifying means includes means to mark a tire which generates a disqualifying signal with an identifying mark, and to mark a tire which generates a qualifying signal with a different identifying mark.

4. The apparatus of claim 2 including a pair of oppositely disposed non-contact capacitance probes.

5. The apparatus of claim 3 wherein said classifying means includes in addition means to generate an audible signal when said tire generates a disqualifying signal.

6. The apparatus of claim 2 including counter means responsive to said disqualifying signal to count the number of disqualified tires.

7. A method for non-destructively testing a pneumatic tire for broken cords and ply separation evidenced by superficial bumps/depressions in sidewalls of said tire, comprising the steps of
   (a) rotating said tire about its axis, (b) positioning a capacitance probe in sensing relationship with said sidewall, (c) amplifying signals from said probe within a preselected range, (d) filtering said signals to produce a band pass of about 2 Hz to about 50 Hz, so as to diminish extraneous 'noise' due to raised lettering on said sidewall, vent stubs, and runout, inter alia, (e) taking a running average based on indicating the width and amplitude of a bump/depression which is acceptable, and adjusting the amplitude and frequency of the bump/depression limits to detect bumps/depressions sufficient to cause said tire to be deemed unacceptable, (f) generating a disqualifying signal upon detection of bumps/depressions sufficient to cause said tire to be deemed unacceptable, and, (g) classifying a disqualified tire as distinguished from a qualified tire.

8. The method of claim 7 wherein the step of selecting signals corresponding to unacceptable bumps/depressions includes (a) adjusting the amplitude and frequency of the bump/depression limits, (b) defining the slope of a preselected segment of said signals, and (c) determining whether variations of the slope fall outside preselected limits.

* * * * *